(12) United States Patent
Schmidt

(10) Patent No.: US 9,555,877 B2
(45) Date of Patent: Jan. 31, 2017

(54) LANDING GEAR

(71) Applicant: Messier-Dowty Limited, Gloucester (GB)

(72) Inventor: Robert Kyle Schmidt, Cheltenham (GB)

(73) Assignee: Safran Landing Systems UK LTD, Gloucester (GB)

( * ) Notice: Subject to any disclaimer, the term of this patent is extended or adjusted under 35 U.S.C. 154(b) by 81 days.

(21) Appl. No.: 14/379,900

(22) PCT Filed: Feb. 19, 2013

(86) PCT No.: PCT/GB2013/050391
§ 371 (c)(1),
(2) Date: Aug. 20, 2014

(87) PCT Pub. No.: WO2013/124636
PCT Pub. Date: Aug. 29, 2013

(65) Prior Publication Data
US 2015/0041587 A1     Feb. 12, 2015

(30) Foreign Application Priority Data
Feb. 24, 2012 (GB) .................................. 1203248.8

(51) Int. Cl.
*B64C 25/20* (2006.01)
*B64C 25/12* (2006.01)
(Continued)

(52) U.S. Cl.
CPC .............. *B64C 25/20* (2013.01); *B64C 25/12* (2013.01); *B64C 25/14* (2013.01); *B64C 25/26* (2013.01);
(Continued)

(58) Field of Classification Search
CPC .......... B64C 25/12; B64C 25/14; B64C 25/26; B64C 25/20; B64C 25/62; B64C 2025/125
See application file for complete search history.

(56) References Cited

U.S. PATENT DOCUMENTS 1,864,134 A    6/1932   Harris
2,567,114 A    9/1951   Linn
(Continued)

FOREIGN PATENT DOCUMENTS

CN    201086822    7/2008
EP       2107273   10/2009
(Continued)

OTHER PUBLICATIONS

International Search Report for PCT International Application No. PCT/GB2013/050391 dated May 28, 2013.
(Continued)

*Primary Examiner* — Timothy D Collins
*Assistant Examiner* — Jessica Wong
(74) *Attorney, Agent, or Firm* — RatnerPrestia

(57) ABSTRACT

A landing gear for an aircraft having a main fitting arranged to be coupled to the aircraft and arranged to move between a stowed condition and a deployed condition and a trailing arm movably coupled to the main fitting. A torsion spring is coupled to the trailing arm such that the movement of the trailing arm causes torsion loading of the torsion spring. A stay assembly is provided which comprises the torsion spring, the stay assembly having a first condition in which it is arranged to react axial loading thereof so as to maintain the main fitting in the deployed condition and a second condition in which it is arranged to permit the main fitting to move between the stowed condition and the deployed condition.

11 Claims, 2 Drawing Sheets

(51) Int. Cl.
*B64C 25/14* (2006.01)
*B64C 25/26* (2006.01)
*B64C 25/62* (2006.01)

(52) U.S. Cl.
CPC ......... *B64C 25/62* (2013.01); *B64C 2025/125* (2013.01)

(56) References Cited

U.S. PATENT DOCUMENTS

| | | | |
|---|---|---|---|
| 2,692,098 A | 10/1954 | Schmued et al. | |
| 2,954,188 A | 9/1960 | O'Connor | |
| 3,144,223 A | 8/1964 | Nichols | |
| 4,047,681 A * | 9/1977 | Hartel | B64C 25/12 244/102 SS |
| 4,170,332 A | 10/1979 | Masclet et al. | |
| 4,422,602 A | 12/1983 | Turiot | |
| 5,863,013 A | 1/1999 | Schmittle | |
| 2002/0056556 A1 | 5/2002 | Guiet | |
| 2009/0050736 A1* | 2/2009 | Bennett | B64C 25/22 244/102 R |
| 2010/0012779 A1* | 1/2010 | Collins | B64C 25/12 244/102 R |
| 2011/0031348 A1 | 2/2011 | Thompson | |
| 2012/0168561 A1* | 7/2012 | Salmon | B64C 25/12 244/102 A |
| 2012/0193470 A1* | 8/2012 | Kosheleff | B64C 1/0009 244/102 R |

FOREIGN PATENT DOCUMENTS

| | | |
|---|---|---|
| EP | 2107273 | 2/2011 |
| GB | 166962 | 7/1921 |
| GB | 351896 | 7/1931 |
| GB | 438165 | 11/1935 |
| GB | 448983 | 6/1936 |
| KR | 20100077594 | 7/2010 |
| RU | 2123961 | 12/1998 |

OTHER PUBLICATIONS

International Preliminary Report on Patentability for International Application No. PCT/GB2013/050391 dated Jun. 12, 2014.
Excerpts from Conway, H.G., "Landing Gear Designs," Chapman and Hall, 1958.
Excerpts from Currey, N.S., "Landing Gear Design Handbook," Lockheed-Georgia Company, 1984.
Examination Report for Application No. GB1203248.8 dated Sep. 13, 2013.
International Search Report and Written Opinion for PCT International Application No. PCT/GB2013/050391 dated May 28, 2013.
Chinese Office Action for Application No. 201380010864.5 dated Jul. 3, 2015.
Chinese Office Action for Chinese Application No. 201380010864. 5, dated Jul. 4, 2016, 4 pages.

* cited by examiner

LANDING GEAR

This application is a U.S. National Phase application of PCT International Application No. PCT/GB2013/050391, filed Feb. 19, 2013, which claims the benefit of GB 1203248.8, filed Feb. 24, 2012.

BACKGROUND

A "levered" or "trailing arm" type landing gear has a main fitting connected to the fuselage of an aircraft, and a trailing arm that is pivotally connected to the main fitting. The trailing arm carries a wheel assembly. When the aircraft lands, landing loads cause the trailing arm to pivot relative to the main fitting. A shock absorber, which is generally an oleo-pneumatic shock absorber, is provided between the main fitting and trailing arm to provide spring and damping functions.

While oleo-pneumatic shock absorbers provide efficient shock absorption, they are generally sensitive to oil and/or gas loss. As such, they require regular maintenance.

It is known to provide an aircraft landing gear with a mechanical spring. A mechanical spring advantageously does not require oil and gas maintenance. However, a mechanical spring is generally heavier than an equivalent gas or liquid spring.

SUMMARY

In accordance with a first aspect of the present invention, there is provided a landing gear for an aircraft, the landing gear comprising:
- a main fitting arranged to be coupled to the aircraft and arranged to move between a stowed condition and a deployed condition;
- a trailing arm movably coupled to the main fitting;
- a spring coupled to the trailing arm such that the movement of the trailing arm causes torsion loading of the torsion spring; and
- a stay assembly comprising the torsion spring, the stay assembly having a first condition in which the torsion spring is arranged to react axial loading thereof so as to maintain the main fitting in the deployed condition, and a second condition in which the torsion spring is arranged to permit the main fitting to move between the stowed condition and the deployed condition. Thus, in addition to serving as a mechanical spring arranged to absorb landing loads, the torsion spring also serves as a side stay, brace or strut which can maintain the landing gear in a deployed condition. This dual purpose of the torsion spring advantageously provides a weight saving relative to known mechanical spring landing gear and in some cases may result in a simpler mechanical landing gear.

The aircraft may have a longitudinal axis and the main fitting may be arranged to be coupled to the aircraft such that the main fitting can move in a first movement plane between the stowed condition and the deployed condition, the first movement plane being non-parallel with respect to the longitudinal axis of the aircraft. This advantageously enables the landing gear to be spaced further from the aircraft fuselage when in the deployed configuration than would be the case if the second movement plane was parallel with respect to the longitudinal axis of the aircraft, thereby increasing the width of the "track" and thus the stability of the aircraft when on the ground. The first movement plane may be generally lateral, or in some embodiments generally orthogonal with respect to the longitudinal axis of the aircraft.

The landing gear may includes a movement device, such an actuator, arranged to move the torsion spring to change the stay assembly between the first and second conditions. Thus, movement of the torsion spring may change the stay assembly between the first and second conditions.

The landing gear may include a locking device arranged to lock the stay assembly in the first condition. The locking device may comprise the actuator.

The stay assembly may be arranged to articulate between the first and second conditions.

The stay assembly may comprise a second torsion spring having a spring stiffness which is different to that of the torsion spring, which may advantageously allow the combined spring stiffness to be tailored to a particular application.

The trailing arm may be arranged to move relative to the main fitting a second movement plane which is generally parallel with respect to the longitudinal axis of the aircraft.

The main fitting may be arranged to be coupled to the fuselage of the aircraft.

The main fitting may be arranged to be pivotally coupled to the aircraft.

The trailing arm may be pivotally coupled to the main fitting.

In accordance with a further aspect of the present invention, there is provided an aircraft including one or more landing gear according to the first aspect.

BRIEF DESCRIPTION OF THE DRAWINGS

By way of example only, certain embodiments of the invention will now be described by reference to the accompanying drawings, in which.

DETAILED DESCRIPTION

Figure 1:
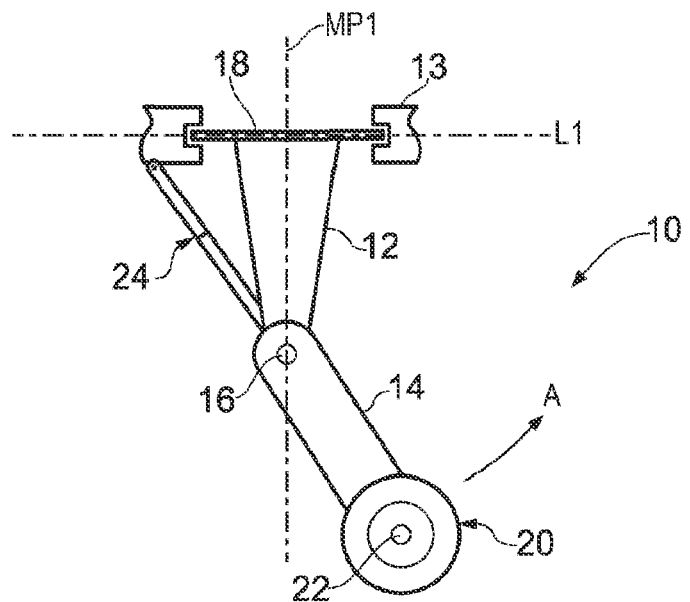
FIG. 1 is a schematic side view of a landing gear according to a first embodiment of the present invention in a deployed condition.
Figure 2:
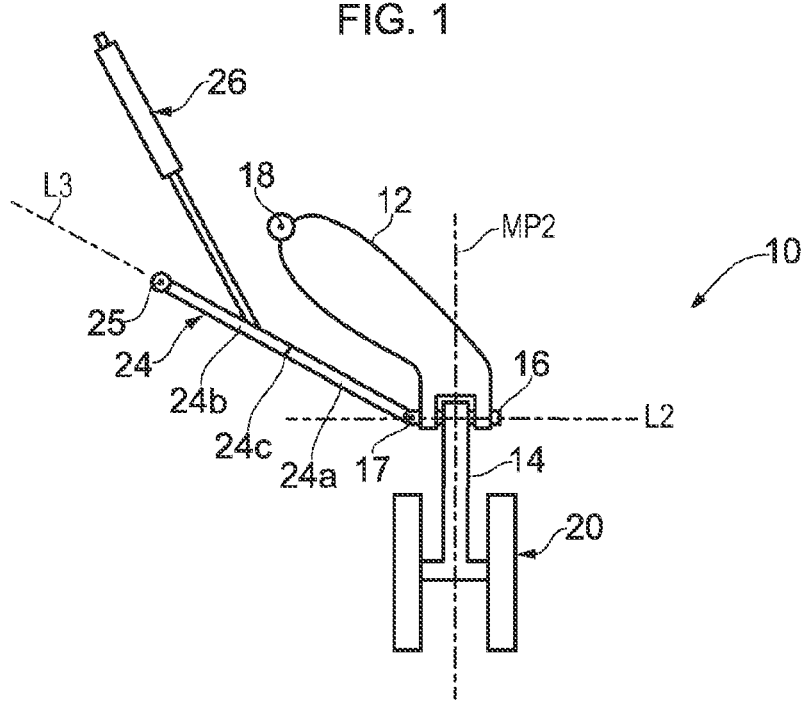
FIG. 2 is a schematic front view of the landing gear of FIG. 1 in a deployed condition.
Figure 3:
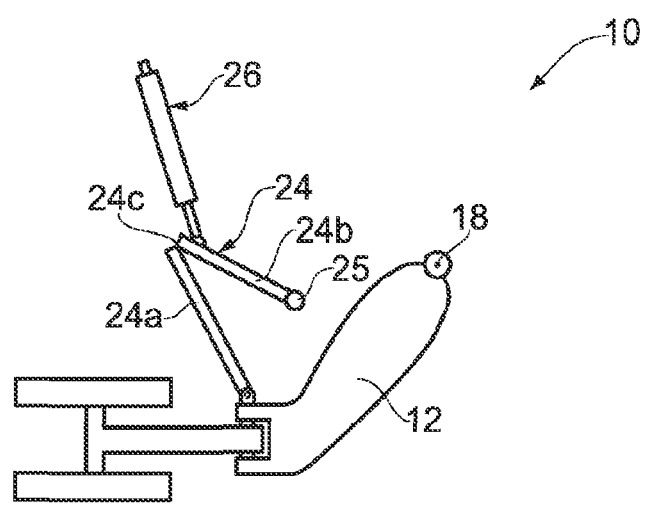
FIG. 3 is a schematic front view of the landing gear of FIG. 1 in a stowed condition.

Referring to the figures, a landing gear 10 includes a main fitting 12 which is arranged to be pivotally connected to the fuselage 13 of an aircraft via pivot 18 such that the main fitting 12 and thus the landing gear 10 can move in a first movement plane MP1 between a stowed condition and a deployed condition. The pivot axis 18 is shown as being generally parallel with respect to the longitudinal axis L1 of the aircraft, although in other embodiments this need not be the case.

A lower portion of the main fitting 12 is pivotally coupled to a trailing arm 14 via a cross pin 16 such that the trailing arm 14 can pivot about the cross pin 16 to move in a second movement plane MP2. A lower portion of the trailing arm 14 is coupled to an axle 22 arranged to carry a wheel and brake assembly 20, or other suitable ground contacting device such as a skid. The cross pin 16 is arranged to rotate with the trailing arm 14. For example, the cross pin 16 may be keyed or splined to the trailing arm 14.

The landing gear 10 includes an elongate torsion spring 24 arranged to absorb landing loads. The torsion spring 24 of this embodiment comprises first and second elongate elements 24a, 24b. A torsion spring element 24a, 24b take any suitable form, such as a flat bar formed from spring steel, a tubular spring steel section, a circular section spring steel element, a composite tubular section, or a conventional spring wrapped around a structural tube.

The first element 24a is coupled to the cross pin 16 at connector 17 such that rotation of the trailing arm 14 about the longitudinal axis L2 of the cross pin 16 causes rotation of the first element 24a of the torsion spring 24 about its longitudinal axis L3. Any suitable connector 17 may be provided, such as a cardan arrangement.

The second element 24b is coupled to the aircraft at connector 25. The connector 25 is arranged such that the portion second element 24b adjacent the connector 25 is fixed against rotation about the longitudinal axis L3. As such, rotation of the cross pin 16 results in torsion loading of the torsion spring 24. However, the connector 25 is arranged to permit the second element 24b to pivot such that the main fitting 12 can move between the deployed condition and the stowed condition. Any suitable connector 25 may be provided, such as a pin joint, or a cardan joint.

The first element 24a of the torsion spring 24 is pivotally coupled to the second element 24b via break pivot 24c. As such, the elements 24a, 24b can pivot about pivot 24c so as to increase and decrease the distance between connectors 17 and 25.

When the aircraft lands, the trailing arm 14 is forced to move in the movement plane MP2 in an arc A, which results in torsion loading of the torsion spring 24. Thus, the torsion spring 24 is arranged to absorb landing loads.

A stay assembly is 24, 26 is provided to govern movement of the landing gear 10 between the deployed condition and the stowed condition. The stay assembly 24, 26 includes the torsion spring 24 and has a first condition in which the torsion spring 24 is arranged to react longitudinally axial loads applied thereto. In the illustrated embodiment this is achieved by the longitudinal axis of the first element 24a being in axial alignment with the longitudinal axis of the second element 24b and the elements being held in this condition by an actuator 26.

Thus, when in the first condition, the torsion spring 24 also functions as part of the stay assembly due to it being arranged to maintain the main fitting 12 and thus the landing gear 10 in the deployed condition. Loads applied to the landing gear 10 that would otherwise move the landing gear 10 in the first movement plane MP1 are reacted by the torsion spring 24. This advantageously provides a weight saving, due to dual role of the torsion spring 24, and in some cases may result in a simple mechanical landing gear.

The stay assembly 24, 26 is arranged to move to a second condition in which the main fitting 12 is permitted to move between the deployed condition and the stowed condition. In the illustrated embodiment this is achieved by the torsion spring 24 being articulated about break pivot 24c. Once the longitudinal axis of the first element 24a moves out of axial alignment with the longitudinal axis of the second element 24b, the torsion spring 24 is no longer arranged to react axial loads and as such permits the main fitting 12 to move between the stowed condition and the deployed condition.

The actuator 26 is coupled between the spring pivot 24c and an anchor point such that extension and retraction of the actuator moves the stay assembly 24, 26 between the first and second conditions. In some embodiments the actuator may be operable to lock the stay assembly 24, 26 in the first condition; for example, the actuator may be locked in a length corresponding to the first condition.

In other embodiments, the stay assembly 24, 26 may be moved between the first and second conditions and/or locked in the first condition by any suitable means; for example, a conventional link lock mechanism may be provided, having first lock element pivotally coupled to an anchor point, such as the aircraft fuselage, at one end and pivotally coupled to a second lock element at its other end. The distal end of the second lock element may be pivotally coupled to the torsion spring 24. As will be appreciated, when the two lock elements are longitudinally aligned, the torsion spring 24 is held such that the stay assembly is in the first condition. When the lock link is articulated such that the lock elements are not longitudinally aligned, the torsion spring 24 is permitted to articulate such that the stay assembly 24, 26 may move between the first and second conditions.

In other embodiments the torsion spring 24 may consist of a single rigid element coupled between the cross pin 16 and an anchor point. In such an embodiment, a lock link or actuator may be provided to move the torsion spring. As will be appreciated, this may result in the main fitting 12 moving in arc between the deployed and stowed conditions.

In other embodiments the second torsion spring element 24b may have different spring characteristics to the first torsion spring element 24a; for example, the second torsion spring element 24b may have different stiffness with respect to the first torsion spring element 24a.

In the illustrated embodiment, the first movement plane MP1 is non-parallel with respect to the longitudinal axis of the aircraft L1, thereby resulting in sideways retraction of the gear 10. This advantageously enables the landing gear to be spaced further from the aircraft fuselage when in the deployed configuration than would be the case if the first movement plane MP1 was parallel with respect to the longitudinal axis L3 of the aircraft, thereby increasing the width of the "track" and thus the stability of the aircraft when on the ground. In some embodiments, the first movement plane MP1 may be generally orthogonal with respect to the longitudinal axis L3 of the aircraft, which may enable a particularly advantageous track width.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parenthesis shall not be construed as limiting the claims. The word "comprising" can mean "including" or "consisting of" and therefore does not exclude the presence of elements or steps other than those listed in any claim or the specification as a whole. The word "coupled" can mean "attached" or "connected". The singular reference of an element does not exclude the plural reference of such elements and vice-versa. In an apparatus claim enumerating several parts, several of these parts may be embodied by one and the same item of hardware. The mere fact that certain measures are recited in mutually different dependent claims does not indicate that a combination of these measures cannot be used to advantage.

The invention claimed is:

1. A landing gear for an aircraft, the landing gear comprising:
   a main fitting being rotatable about a first pivot between a deployed position and a stowed position, and having a second pivot spaced from the first pivot;
   a trailing arm movably coupled to the main fitting at the second pivot;

a torsion spring coupled to the trailing arm such that the movement of the trailing arm causes torsion loading of the torsion spring about its longitudinal axis;

wherein the torsion spring is reconfigurable between a first configuration in which the torsion spring reacts longitudinal axial loading along the torsion spring so as to maintain the main fitting in the deployed condition, and a second configuration in which the torsion spring permits the main fitting to move from the deployed condition and the stowed condition.

2. A landing gear according to claim 1, wherein:

the first pivot is attached by the first pivot to an aircraft fuselage having a longitudinal axis; and the first pivot is oriented such that the main fitting moves in a first movement plane between the stowed condition and the deployed condition, the first movement plane being non-parallel with respect to the longitudinal axis.

3. A landing gear according to claim 2, wherein the first movement plane is generally lateral with respect to the longitudinal axis.

4. A landing gear according to claim 1, further comprising a movement device arranged to move the torsion spring between the first configuration and second configuration.

5. A landing gear according to claim 1, further comprising a locking device arranged to lock the torsion spring in the first configuration.

6. A landing gear according to claim 1, wherein the torsion spring comprises first and second elements.

7. A landing gear according to claim 6, wherein the second torsion spring element has different spring stiffness with respect to the first torsion spring element.

8. A landing gear according to claim 1, wherein the second pivot is oriented such that the trailing arm moves relative to the main fitting in a second movement plane which is generally parallel with respect to the aircraft longitudinal axis.

9. A landing gear according to claim 1, wherein the trailing arm is movably coupled to the main fitting by a pivot pin and a stay assembly is coupled to the pivot pin by a connector such that pivotal movement of the trailing arm causes rotation of the torsion spring within the stay assembly.

10. A landing gear according to claim 9, wherein the connector comprises a cardan joint.

11. An aircraft comprising:

an aircraft fuselage; and one or more landing gear comprising:

a main fitting coupled to the aircraft fuselage and movable between a stowed condition and a deployed condition, a trailing arm movably coupled to the main fitting, and a torsion spring coupled to the trailing arm such that the movement of the trailing arm causes torsion loading of the torsion spring about its longitudinal axis, wherein the torsion spring is reconfigurable between a first configuration in which the torsion spring reacts axial loading along the torsion spring so as to maintain the main fitting in the deployed condition, and a second configuration in which the torsion spring permits the main fitting to move from the deployed condition to the stowed condition.

* * * * *